Dec. 5, 1933.   H. H. HARADA   1,937,888
GEARLESS TYPE PRESSURE GAUGE
Filed Sept. 20, 1928
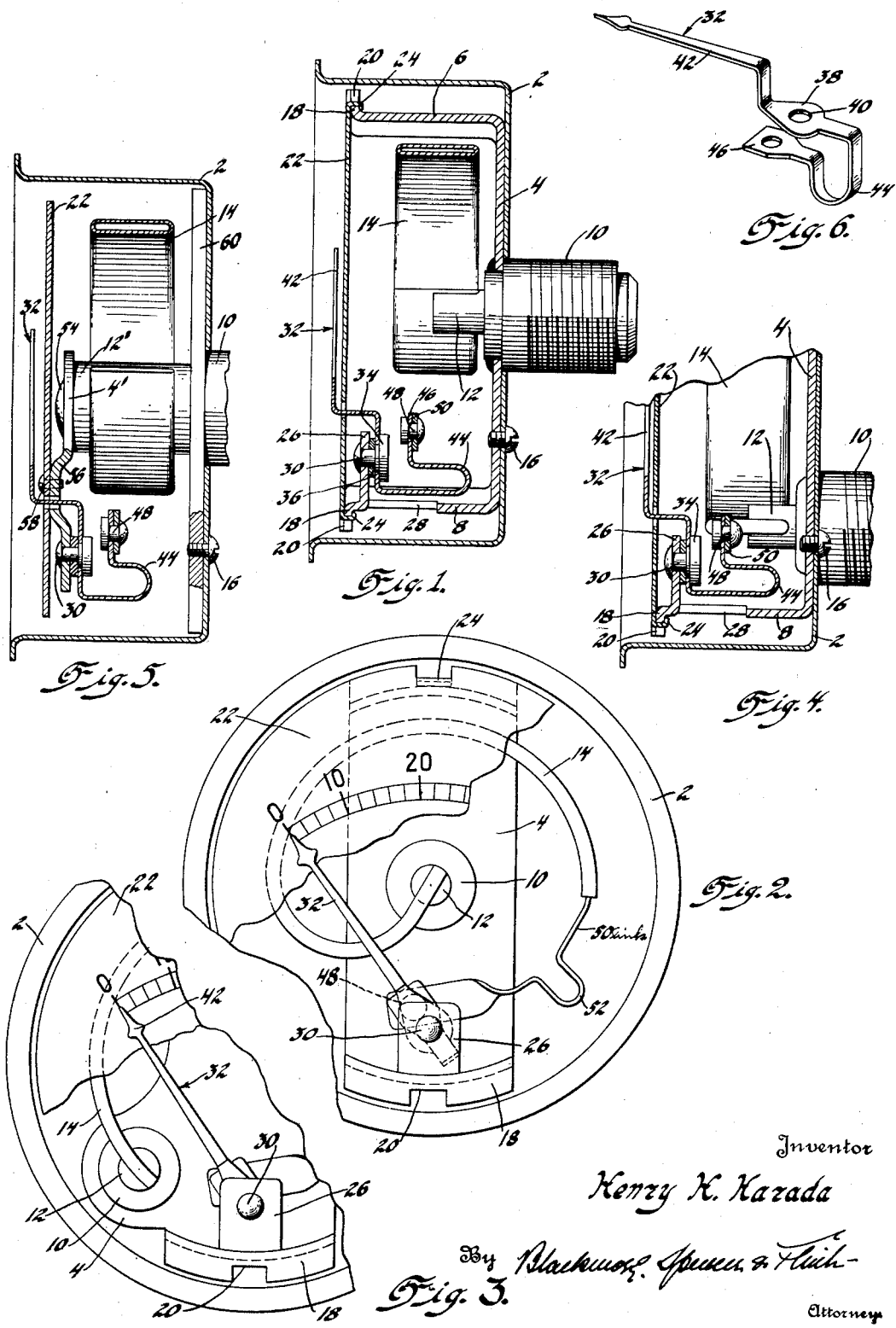
Inventor
Henry K. Harada
By Blackmore, Spencer & Fluth
Attorneys Patented Dec. 5, 1933

1,937,888

UNITED STATES PATENT OFFICE 1,937,888

GEARLESS TYPE PRESSURE GAUGE

Henry H. Harada, Flint, Mich., assignor to A C Spark Plug Company, Flint, Mich., a company of Michigan Application September 20, 1928
Serial No. 307,101

6 Claims. (Cl. 73—109)

This invention relates to gauges and is particularly adaptable to gauges of the Bourdon tube type, although it is not necessarily applied to this type of gauge.

In prior gauges the pointer has usually been mounted on a shaft which has been pivoted at its ends in the frame of the gauge. The frame has been composed of a base plate and a second plate spaced therefrom connected by pillars and the pointer shaft mounted between these two plates.

It is the object of the present invention to eliminate the shaft and support the pointer on a single pivot thereby insuring a greatly simplified construction. The invention also has for its object to eliminate the pillars and second plate by forming the frame of a single piece of stamped metal.

The object of the invention is accomplished by providing the frame with a pair of fingers extending away from the base portion. One of these fingers has pressed therefrom a tongue provided with an opening in which there is positioned the rivet or pin which passes through the pointer and serves as the pivotal point therefor.

The pointer is preferably formed of a single piece of metal, the outer portion forming an index while the inner portion is formed in the shape of a loop which is adjustable to aid in calibrating the gauge. The loop end of the pointer is connected by means of a suitable link to the end of a Bourdon tube mounted in the socket secured to the base of the frame.

The ends of the fingers are preferably flanged and slotted and a dial fitted on the flanged portions. A portion of the dial is pressed inwardly through the slotted portions and bent around the fingers to rigidly hold the dial in place.

As a modification the frame is mounted directly on the socket end which is extended somewhat past the Bourdon tube end. This frame has a slightly raised portion on which the dial is mounted and is provided with openings to mount the pivot for the pointer as well as to allow the pointer to project out over the dial.

Referring to the drawing:

Fig. 1 shows a side sectional view of the gauge constructed in accordance with the invention.

Fig. 2 is an elevational face view of the structure of Fig. 1, with the dial partly removed.

Fig. 3 is a fragmentary elevational view corresponding to Fig. 2 of a modification.

Fig. 4 is a partial sectional view corresponding to Fig. 1 of the modification of Fig. 3.

Fig. 5 is a sectional view corresponding to Fig. 1 of another modification.

Fig. 6 is a perspective view of the pointer.

Referring to Fig. 1, the numeral 2 indicates the casing of the gauge. In the casing there is positioned the support or frame 4 comprising a base portion and the fingers 6 and 8. Only two fingers are shown, but as many as desired may be provided.

Mounted at the rear of the casing and in the base portion of the frame 4 is the stud or socket 10 which projects into the casing and has a reduced slotted end 12 in which the Bourdon tube 14 is mounted. The frame is secured to the casing 2 by means of the screws 16.

The ends of the fingers 6 and 8 are flanged as shown at 18 and each flange provided with a recess 20. A dial 22 rests in the flanges 18 and has a portion 24 bent or crimped therefrom into the recesses 20 and over the flanged portion 18 to rigidly hold the dial in position.

The finger 8 has a tongue 26 upwardly pressed therefrom leaving an opening 28 in the finger 8. The tongue 26 is provided with an opening in which there is mounted the rivet or pin 30 on which the pointer 32 is pivotally mounted. The rivet 30 has the enlarged end 34 and a washer 36 provided between the pointer and the tongue 26. The central portion of the pointer 32 is enlarged as at 38 and is provided with an opening 40 for the passage of the pin 30.

The outer end of the pointer 32 is formed into an index 42 while the inner portion is formed into a loop 44, the end 46 of which is bent at an angle and provided with an opening for the reception of a pivot pin 48. The end 46 is connected by means of a link 50 to the free end of the Bourdon tube 14.

The link 50 is permanently and rigidly secured, as by soldering, in the end of the Bourdon tube 14. When in operative position, as shown in Figure 2, the link is under tension with the inward end thereof at the pivot 48 tending to move away from the pivot, or inwardly toward the center of the gauge, and radial to the axis of the pivot 48. The purpose of this construction is to give a binding action and prevent looseness of the parts.

The function of the loop 44 is to provide an adjustable part to aid in calibrating the gauge. By bending the loop so as to close or open the gap, the pivotal points of the pins or rivets 30 and 48 will be drawn closer or moved farther away from each other and thereby determine the amount of swing of the index 42. In addition the link 50 may have a calibrating loop 52 formed therein.

The species of Fig. 3 differs from that of Figs. 1 and 2, in that the socket 10 is mounted at one side of the frame or near the edge of the casing and a Bourdon tube of circular instead of spiral form is used.

Referring to the species of Fig 5 it will be seen that the socket 10 has its inner portion 12′ extended beyond the Bourdon tube 14. The frame 4′ is mounted on the end of the socket by means of the riveted over or peened over portion 54. The frame 4′ has a portion 56 bent out of the plane thereof and the dial 22 is secured to this portion by means of the rivets 58. On the free end of the frame 4′ there is mounted the pointer 32 which is in all respects similar to the pointer 32 of Fig. 1. The mounting of the pointer is in all respects similar to the mounting shown in Figs. 1 and 4.

In the species of Fig. 5, use is made of a base plate 60 which is flat and preferably substantially rectangular in shape and is secured to the casing 2 by means of the screws 16.

From the consideration of both species, it will be apparent that the usual pointer shaft is eliminated and the pointer mounted to swing on the single pivot instead of two as in prior constructions. A gearless type gauge is thus produced, the parts of which may be made of stamped metal and are therefore easy and cheap to manufacture and assemble.

I claim:

1. In a fluid pressure gauge of the kind described having a support, a pressure responsive member and a slotted dial face bearing calibrated measurement markings, an indicator member having an intermediate portion thereof fixedly pivoted on said support, with one end portion projected laterally outwardly and through a slot in said dial and terminating in a pointer finger movable over said markings, and with its other end portion projected laterally inwardly and embodying an adjustable reversely bent loop terminating in an attachment ear, a connecting element having one end fixedly attached with said pressure responsive element and a fixed pivotal connection between said connecting element and said attachment ear offset relative to the pivotal mounting of the indicator member and adapted to be set in a predetermined relation by the adjustment of said loop to vary the effective leverage thereof, said connecting element embodying a spring loop variable in size for adjustment purposes and capable of exerting a force in a direction radial to the axis of the pivotal connection between said attachment ear and connecting element to effect a binding action on the pivotal connection and compensate for looseness therein.

2. In a fluid pressure gauge of the kind described having a pressure responsive member and a dial face bearing calibrated measurement markings, said dial having a slot, means for mounting said member and face, an indicator member having an intermediate portion thereof fixedly pivoted on said means, with one end portion projected laterally outwardly and through said slot and terminating in a pointer finger movable over said markings, and with its other end portion projected laterally inwardly and embodying an adjustable reversely bent loop terminating in an attachment ear, a tongue on said means, said pivoted portion mounted on said tongue, a connecting element having one end fixedly attached with said pressure responsive element and a fixed pivotal connection between said connecting element and said attachment ear offset relative to the pivotal mounting of the indicator member and adapted to be set in a predetermined relation by the adjustment of said loop to vary the effective leverage thereof, said connecting element embodying a spring loop variable in size for adjustment purposes and capable of exerting a force in a direction radial to the axis of the pivotal connection between said attachment ear and connecting element to effect a binding action on the pivotal connection and compensate for looseness therein.

3. In a Bourdon tube gauge, a flat spring link rigidly and immovably connected at one end to said Bourdon tube, a pointer and pointer swinging mechanism pivotally mounted in said gauge, and a permanent pivotal connection between said link and mechanism, said link exerting a spring tension on said pivotal connection to prevent play at the pivot.

4. In a fluid pressure gauge of the kind described having a support, a pressure responsive member and a slotted dial face bearing calibrated measurement markings, an indicator member having an intermediate portion thereof fixedly pivoted on said support, with one end portion projected laterally outwardly and through a slot in said dial and terminating in a pointer finger movable over said markings, and with its other end portion projected laterally inwardly and embodying an adjustable reversely bent loop terminating in an attachment ear, a connecting element having one end fixedly attached with said pressure responsive element and a fixed pivotal connection between said connecting element and said attachment ear offset relative to the pivotal mounting of the indicator member and adapted to be set in a predetermined relation by the adjustment of said loop to vary the effective leverage thereof.

5. In a fluid pressure gauge of the kind described having a pressure responsive member and a dial face bearing calibrated measurement markings, said dial having a slot, means for mounting said member and face, an indicator member having an intermediate portion thereof fixedly pivoted on said means, with one end portion projected laterally outwardly and through said slot and terminating in a pointer finger movable over said markings, and with its other end portion projected laterally inwardly and embodying an adjustable reversely bent loop terminating in an attachment ear, a tongue on said means, said pivoted portion mounted on said tongue, a connecting element having one end fixedly attached with said pressure responsive element and a fixed pivotal connection between said connecting element and said attachment ear offset relative to the pivotal mounting of the indicator member and adapted to be set in a predetermined relation by the adjustment of said loop to vary the effective leverage thereof.

6. In a Bourdon tube gauge, a flat spring link rigidly and immovably connected at one end to said Bourdon tube, a pointer and pointer swinging mechanism pivotally mounted in said gauge, and a permanent pivotal connection between said link and mechanism, said link exerting a spring tension on said pivotal connection to prevent play at the pivot, the line of action of said spring tension extending substantially parallel with the pointer.

HENRY H. HARADA.